(12) United States Patent
Feret et al.

(10) Patent No.: US 6,283,161 B1
(45) Date of Patent: Sep. 4, 2001

(54) FLEXIBLE TUBE HAVING AT LEAST ONE ELONGATED REINFORCING ELEMENT WITH A T-SHAPE

(75) Inventors: Jany Feret, Marly le Roi; José Mallen Herrero, Paris, both of (FR)

(73) Assignees: Institut Francais du Petrole, Rueil-Malmaison cedex; Coflexip, Paris (FR)

( * ) Notice: Subject to any disclaimer, the term of this patent is extended or adjusted under 35 U.S.C. 154(b) by 0 days.

(21) Appl. No.: 09/499,516

(22) Filed: Feb. 9, 2000

Related U.S. Application Data (63) Continuation of application No. 08/172,194, filed on Dec. 23, 1993, now Pat. No. 6,065,501, which is a continuation of application No. 07/655,423, filed on Feb. 26, 1991, now abandoned.

(30) Foreign Application Priority Data

Jun. 30, 1989 (FR) ................................... 89 08854

(51) Int. Cl.[7] .................................................. F16L 11/16
(52) U.S. Cl. ........................... 138/134; 138/133; 138/135
(58) Field of Search .................................. 138/129, 132, 138/133, 134, 135

(56) References Cited

U.S. PATENT DOCUMENTS

| | | | |
|---|---|---|---|
| 500,847 | * 7/1893 | Bowley | 138/135 |
| 1,055,262 | * 3/1913 | Fischer | 138/134 |
| 1,055,263 | * 3/1913 | Fischer | 138/134 |
| 1,164,521 | * 12/1915 | Houben | 138/134 |
| 1,779,592 | * 10/1930 | Goodall | 138/134 |
| 2,330,651 | * 9/1943 | Welger | 138/133 |
| 3,011,775 | * 12/1961 | MacLeod | 138/133 |
| 3,122,171 | * 2/1964 | Britton et al. | 138/129 |
| 4,733,629 | * 3/1988 | Hunt et al. | 138/129 |
| 5,645,109 | * 7/1997 | Herrero et al. | 138/130 |
| 5,813,439 | * 9/1998 | Herrero et al. | 138/130 |
| 6,006,788 | * 12/1999 | Jung et al. | 138/134 |
| 6,065,501 | * 5/2000 | Feret et al. | 138/134 |

FOREIGN PATENT DOCUMENTS

| | | |
|---|---|---|
| 1081339 | * 8/1967 | (GB) . |
| 150080 | * 10/1984 | (JP) . |

* cited by examiner

*Primary Examiner*—James Hook
(74) *Attorney, Agent, or Firm*—Antonelli, Terry, Stout & Kraus, LLP (57) ABSTRACT

The present invention relates to a reinforced flexible tube having at least one elongated reinforcing element. According to the invention, this elongated element has a cross section or profile in the form of a T and is wound helically.

48 Claims, 3 Drawing Sheets

FLEXIBLE TUBE HAVING AT LEAST ONE ELONGATED REINFORCING ELEMENT WITH A T-SHAPE

This application is a Continuation of U.S. Ser. No. 08/172,194, filed Dec. 23, 1993 now U.S. Pat. No. 6,065,501, which is a Continuation of U.S. Ser. No. 07/655,423, filed Feb. 26, 1991 now abandoned.

FIELD OF THE INVENTION

The present invention relates to a flexible tube having an elongated reinforcing element with a T-shaped cross section.

BACKGROUND OF THE INVENTION

According to the prior art, reinforcing shapes with a flattened form used for flexible tubes are, either S-shaped or Z-shaped and are consequently are difficult to manufacture and install precisely and stably in a helical wrap, or are U-shaped as disclosed, for example, in FR 2,561,745. However, flattened U-shaped reinforcing shapes do not have optimum performance with a given layer thickness since the U shape reinforcing element must be thin in order to receive the arms of adjacent windings.

SUMMARY OF THE INVENTION

In the present text, an elongated reinforcing element may be designated by the terms "shaped element" or "shape." The present invention relates to a reinforced flexible tube having an elongated reinforcing element that is easy to manufacture and install, is stable once installed, and gives good performance optimization for a given layer thickness.

Moreover, the shape according to the invention avoids or reduces contact pressures between adjacent reinforcing elements as may be observed in the case of Z or S shapes.

Moreover, the device according to the invention does not require the use of a large number of rings.

In general, the present invention relates to a reinforced flexible tube having at least one elongated reinforcing element.

According to the invention, the elongated element has a T-shaped cross section or profile, and is wound helically.

At least one edge of the elongated element may have a form designed to cooperate with a matching form to effect an interlock.

The matching form may be that of the edge of another elongated element having a cross section with a T shape with, this element being mounted in the reverse direction.

The matching form may be that of the edge of an elongated element, possibly made of metal, with a U-shaped cross section. The U-shaped elongated element may be placed such that the arms of the U extend outwardly or so that the arms of said U extend toward the tube axis, in which case the T-shaped elongated element will be placed appropriately.

When the arms of the U-shaped element extend toward the tube axis (i.e. the U-shaped element is located on the outside relative to the T-shaped element with which it cooperates), its role may be confined to keeping the adjacent-shaped wires in position. In this case, the T-shaped elements will receive most of the stresses due to internal pressure and the U shape may be dimensioned accordingly, i.e. the surface area of the U section may be small by comparison to that of the T-shaped element. The U-shaped element may be made of plastic, steel, or aluminum.

The tube according to the invention may have two elongated elements each having a T-shaped cross section, with the elongated elements being wound helically in the same direction, the first having its part of the cross section, corresponding to the foot of the T, directed toward the tube axis and the similar part of the second element being directed in the opposite direction.

These two elongated elements may have T shapes of the same height.

The first and second elongated elements may have the same section.

The first and second elongated elements may be made of metal.

The first elongated element may have a lower elasticity modulus than that of the second element.

The first and second elongated elements may have the same elasticity modulus.

The width of the part of the first element corresponding to the foot of the T may be greater than the width of the similar part of the second element.

The first and second elongated elements may be made and dimensioned to have the same elongation when the tube is internally pressurized, with no substantial transfer of force from one to the other of the elements by the respective edges of each of these elements.

The tube according to the invention may include aluminum and/or steel. In particular, at least one of the elongated elements with a T shape may be made of or include metal such as steel or an aluminum alloy.

At least one elongated reinforcing element may contain essentially aluminum or an aluminum alloy.

The ratio between the length (l) of the T arm to the height (e) of the T shape may be in a range of 0.5 and 1 and preferably, in a range of 0.66 and 1.

The ratio between the foot width P and the arm length (l) may be in a range of 1 and 3.

The ratio between the foot width P and the height (e) of the T shape may be in a range of 0.66 and 3.

The ratio between the width L of the head of the T shape and the height (e) of the T shape may be in a range of 1.66 and 5.

The width L of the head of the T shape will hereinafter be designated width (L) of the T.

The ratio between the height h of an arm and the height e of the T shape may be in a range of 0.66 and 0.83.

The ratio between the height of a lobe of arm C and the height (e) of the T shape may be in a range of 0.16 and 0.66 and preferably approximately 0.33.

The ratio of radial play between two T shapes nested head to foot in each other to the width of the T shape may be in a range of 2% and 10%.

The tube according to the invention may have an internal pressure-resistant armor or "arch" having at least one elongated element with a T shape.

The tube according to the invention may have a T shape with a winding angle substantially greater than 80° and, preferably, greater than 850 relative to the axis of the flexible tube.

The tube according to the invention may have at least one reinforcing layer and one internal sealing sheath that rests on the layer, which will also be designated internal layer. This internal layer may have a plurality of elongated elements with a T shape. This internal layer may have axial interlocking means.

The tube according to the invention may have several reinforcing layers and, of these layers, only the internal layer may have axial interlocking means.

The tube according to the invention may have two reinforcing layers one of which corresponds to the internal layer. The elongated elements of the internal layer may be wound at a first angle in a first direction relative to the tube axis and the elongated elements of the second layer may be wound at a second angle in the opposite direction, and one of the angles may be greater than or essentially equal to 55° and the other may be less than or essentially equal to 55°.

The tube according to the invention may also have two pairs of layers, one of these layers corresponding to the internal layer, with each of the layers of a given pair having elongated reinforcing elements wound at equal angles but in opposite directions, and the angle of one of the pairs may be greater than or essentially equal to 55° and the angle of the other pair may be less than or essentially equal to 55°.

The present invention also relates to a wire or elongated element for manufacturing flexible tubes, said wire having a T shape.

The material of the wires according to the invention, or the geometry of the shape of these wires, may correspond to that described in the preceding pages relative to the elongated element.

The tube according to the invention may have an internal carcass resistant to external pressure having at least one elongated element with a T shape.

The present invention relates advantageously to "multi-layer" reinforced flexible tube structures including:
- a pressure-resistant armor having one or more layers of rings or wires, cables, or shapes wound at a large angle, for example, 80° or 85° relative to the axis of the flexible tube.
- a traction-resistant armor having at least two layers and preferably one or more pairs of cross layers of wires, cables, or shapes wound generally at an angle of less than or approximately 55°, with this angle not being too small to preserve the flexibility of the pipe, and
- an inner armor, that is, an internal carcass resistant in particular to crushing forces, with the inner armor being generally composed of a helically wound layer of a shape at a large angle.

These layers may be disposed in any order inside or outside the structure of the flexible tube, and may or may not be separated by thin plastic sheaths.

Constructions of the aforementioned type are described in, for example, U.S. Pat. No. 1,417,966.

It should be noted that the T shape according to the invention exhibits practically no "tiling" phenomena, i.e. once in place on the flexible tube, it has no tendency to twist about itself. This allows a simple armoring machine to be used to install the T shape on the flexible tube.

Since spiral laying of the T can be accomplished with practically no tiling, a flexible tube can also be made without a traction armor as the lengthwise bottom effect is taken up by the interlock. Of course, this flexible tube, for any diameter considered, will be limited in service pressure.

Moreover, the present invention also relates to flexible tubes having at least one elongated element with a T-shaped cross section laid- at all winding angles including 55°. This is possible in particular because the T shape exhibits practically no tiling problems.

Hence, it is possible to consider increasing the service pressures of flexible tubes with two armor layers, by limiting the play in the layer in contact with the sealing sheath.

Finally, the T shape allows a shape width to be used (i.e. the length of the T crossbar) that is greater than that permitted by other shapes such as S and Z.

The T shape may have a winding angle that is far greater than 80°, preferably greater than 85°, relative to the axis of the flexible tube. In this case, the resistance to axial forces is principally provided by the traction-resistant armors.

The tube may have an elongated element with a T shape and this elongated element may be wound at an angle of approximately 55° relative to the axis of the flexible tube.

The tube may have two reinforcing layers, at least one of which will have a plurality of elongated elements having a T shape wound at an angle of 55° in one direction relative to the tube axis. This first layer will also have a plurality of elongated elements matching those mentioned above, possibly having a T shape. The other layer will have a plurality of elongated elements wound at an angle of 55° in the opposite direction relative to the direction of the first layer.

The angles of each of the layers of the layer pair do not have to be symmetrical with respect to the axis of the flexible tube.

In this case, the winding angle of one layer may be greater than 55°, and the other less than 55°, these angles being considered relative to the tube axis.

Advantageously, the elongated element with a T shape may be used to constitute the pressure-resistant armor and/or the internal carcass.

BRIEF DESCRIPTION OF THE DRAWINGS

The accompanying drawings show flexible reinforced pipes to which the invention applies, as well as specific nonlimiting examples of elongated element shapes.

DETAILED DESCRIPTION

Figure 1:
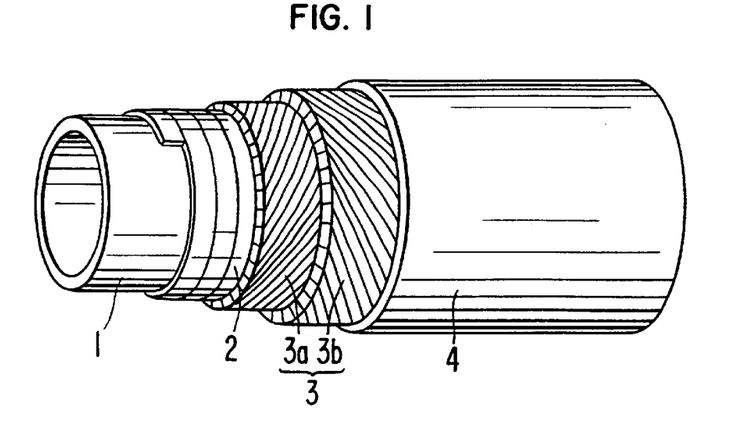
FIG. 1 is a perspective view of a first type of reinforced flexible pipe constructed in accoreance with the present invention.

Referring now to the drawings wherein like reference numerals are used throughout the various views to designate like parts and, more particularly, to FIG. 1, according to this figure, an inner pipe 1 of plastic such as, for example, polyamide 11 is covered with a pressure-resistant armor 2 which, in the example illustrated, is formed by winding a preformed shape wound helically at an angle exceeding 85°, for example, relative to the pipe axis. The inner pipe 1 and pressure resistant armor 2 are covered with a traction-resistant armor including two cross-layers 3a, 3b fashioned of shapes or elongated elements helically wound in two layers having opposite pitches.

The winding angle of the shapes or elongated elements is usually between 20° and 50° relative to the pipe axis.

An outer sheath 4, made, for example of, polyamide 11 or polyethylene, covers the above assembly thus formed.

Figure 2:
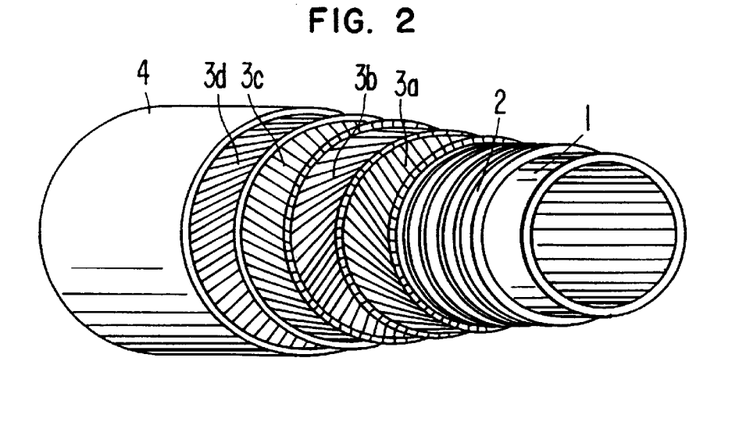
FIGS. 2 and 3 are perspective views of other types of pipes constructed in accordance with the present invention.

The flexible pipe of FIG. 2 includes a traction-resistant armor has two pairs of cross layers 3a, 3b and 3c, 3d of shapes wound helically at an angle that may be between 20° and 50° relative to the pipe axis.

Figure 3:
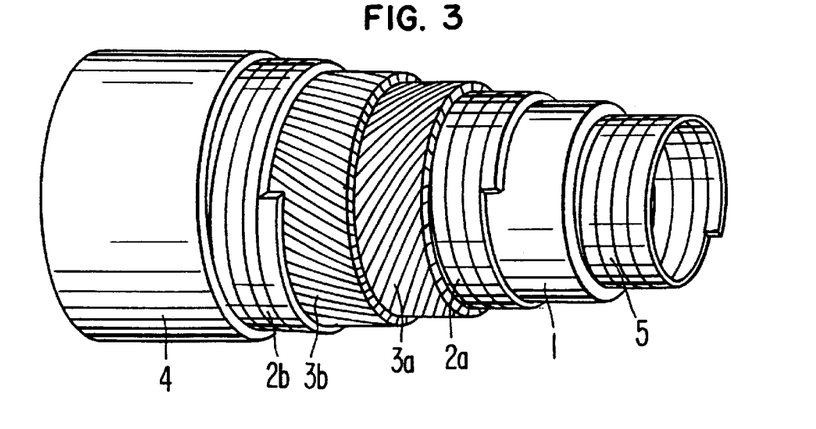

In the pipe of FIG. 3, a steel carcass 5 is disposed inside pipe 1 made of plastic and layers 2a and 2b of the pressure-resistant armor and disposed one on each side of traction-resistant armor 3a, 3b.

Figure 4:
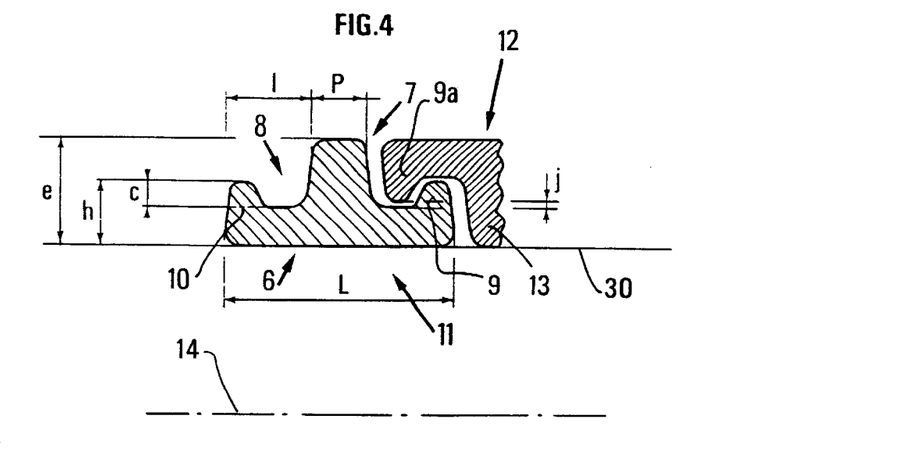
FIG. 4 is a cross-sectional view of an elongated element according to the invention.

According to the invention, at least one layer of wound shapes or elongated elements has a T shaped as shown in FIG. 4.

In FIG. 4, letter L designates the width of the T shaped element; it corresponds to the crossbar 6 of the T shaped element; letter e designates the height of the T. Letter P designates the width of the foot 7 of the T. Letter l designates the length of the arm 8 of the T. Letter h designate shaped element designates the height or thickness of an arm 8 of the T. Letter c designates the height of lobe 9 of arm 8 of the T.

Dashed line 10 corresponds to a T shape that has no lobe, in which case c is zero.

Reference numeral 11 designates the T shaped section as a whole, with such section corresponding to a given elongated element. Reference numeral 12 designates the T shape of another elongated element 11 which cooperates with the given elongated element. These two elongated elements 11, 12 are disposed head to foot, i.e. for one of them, foot 7 of the T shaped element points toward the outside of the tube while for the other, foot 13 points toward axis 14 of the tube. These elongated elements are considered to match each other.

When these elements have shapes that have arms with lobes 9, there is axial interlocking of the shapes, i.e. axial displacement of a shape 11 relative to adjacent shape 12 is limited when these two shapes move away from each other. Thus, the lobes are locking or hooking means.

Of course, the proximity of these two shapes is limited by the edge of a T lobe 9 which abuts adjacent foot 13.

Figure 5:
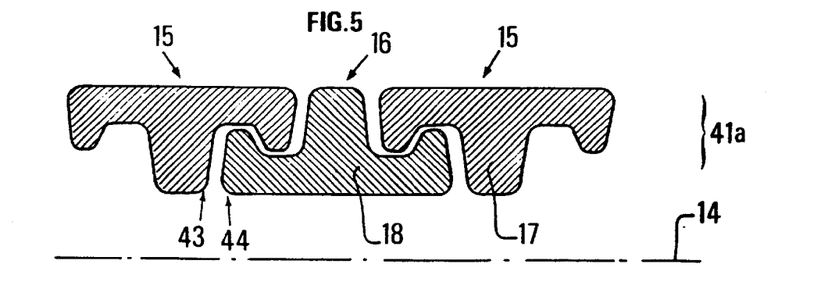
FIGS. 5–7 are cross-sectional views of alternate shapes of an elongated element according to the present invention.

FIG. 5 represents the case of a layer having two elongated elements 15 and 16 having the same cross sections 17 and 18 mounted head to foot. As shown in FIG. 5, elongated elements 15 and 16 alternate, with each turn of the elongated element 15 being framed by the turns of element 16 and each turn of element 16 being framed by the turns of element 15.

Figure 6:
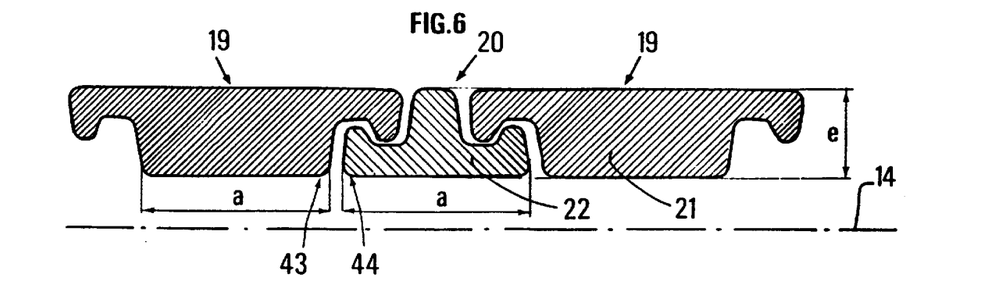

FIG. 6 represents the case where the two elongated elements 19 and 20 have different cross sections 21 and 22, but in FIG. 6, the two shapes 21 and 22 have the same height e.

Moreover, in FIG. 6, the width L of the T shape 22 of elongated element 20 has essentially the same value as the width p of the foot of T shape 21 of elongated element 19 (FIG. 6).

Moreover, it will not be a departure from the framework of the present invention for the two elongated elements to have different mechanical characteristics, particularly with respect the elasticity modulus, or to be made of different materials.

Thus, elongated element 20 may have a higher elasticity modulus than that of elongated element 19.

In FIG. 6, reference numeral 14 designates the axis of the flexible tube.

Figure 7:
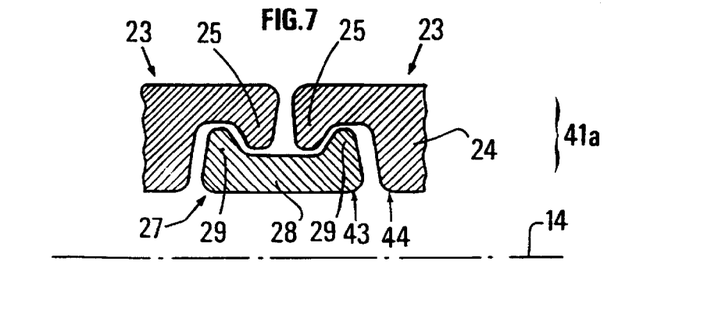

FIG. 7 represents the case of an elongated element 23 with a T shape 24 with a lobe 25, where elongated element 23 is wound helically in a contiguous manner, i.e. one edge of an arm of the elongated element is in contact or nearly in contact with the other edge of the adjacent turn of this elongated element.

Elongated element 23 is interlocked by a matching elongated element 27 with a U shape 28. In FIG. 7, the arms 29 of the U-shaped element 27 are pointing away from axis 14.

It will not be a departure from the framework of the present invention for the elongated elements to be installed in the reverse direction, i.e. for the arms of the U-shaped element 27 to point toward the tube axis 14.

Elongated elements 23 and 27 may be made of metal, for example steel and/or aluminum.

Also, it will not be a departure from the framework of the present invention for the elongated element with a T shape to be made of metal and the elongated element with a U shape to be made of plastic, such as a thermoplastic.

The elongated element with a T cross section or shape, in the flexible tube according to the invention, will preferably remain within one or more of the following ranges:

$$*0,5 \leq \frac{l}{e} \leq 1$$

and preferably $$0,66 \leq \frac{L}{e} \leq 1$$

$$*1 \leq \frac{P}{l} \leq 3$$

$$*0,66 \leq \frac{P}{e} \leq 3$$

$$*1,66 \leq \frac{L}{e} \leq 5$$

$$*0,66 \leq \frac{h}{e} \leq 0,83$$

$$*0,16 \leq \frac{c}{e} \leq 0,66$$

and preferably approximately 0.33 *radial play between 2% and 10%.

"Radial play" is understood to be the distance moved radially by the T shaped element before the element is immobilized by the immobile adjacent shape relative to the height e of the T shaped element.

With the starting point of this movement being a straight line on which the T shape and the adjacent shape rest, this play is designated by reference j in FIG. 4 and the straight line has reference numeral 30.

The straight line corresponds essentially to the generatrix of the cylinder on which these elongated elements are wound, at least when the winding angle is large.

An estimate of the behavior of two elongated elements with identical T-shaped cross sections or shapes nested head to foot (FIG. 5) has been made, where the internal diameter was 95.4 mm.

The elongated elements were made of steel, so that the Young's modulus of the elongated elements was 200 MPa and the Poisson coefficient, 0.3.

The T shape was characterized by L=14.2; e=6.2; P=2.85; l=5.67; h=3.80; c=1.64. At an internal pressure of 20 MPa, the radial movement of wire 16 was 0.060 mm, and that of wire 15, 0.0085 mm. The two shapes were not in contact, with a play of 0.246 mm.

With a play of 0.246, contact occurs at an internal pressure of 95 MPa.

At an internal pressure of 20 MPa, the circumferential stresses of wire 15 are at an average level of 33 MPa. They vary by +18% from this value as a function of the position in the T cross section.

The average level of circumferential stresses of wire 16 is 235 MPa and the stresses vary by +6% from this value.

The T shaped element according to the present invention is particularly well matched to pressure armors 2 and may advantageously have a winding angle of greater than or equal to 55°.

The T shaped element could also be advantageously used to make the internal carcass, such as 5 in FIG. 5.

Figure 8:
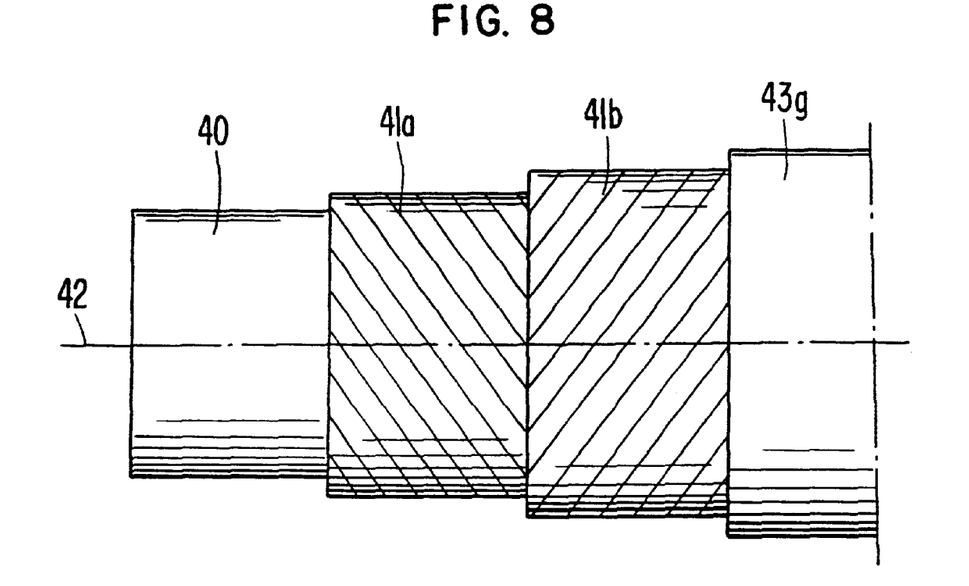
FIG. 8 is a plan view of a flexible tube constructed in accordance with the present invention having a reinforcing armor with two layers of elongated elements wound at an angle of 55° with respect to the axis of the tube, one on each side of this axis.

FIG. 8 represents an embodiment of a particularly advantageous flexible tube having an internal tube 40 which may be made of plastic, for example polyamide 11, and an armor 41 composed of two cross layers 41a and 41b wound helically at an angle of 55° relative to axis 42 of the flexible tube.

Thus, these two layers 41a and 41b form a pair of layers, with each of these layers having elongated elements wound at the same angle, in this case 55°, but each of these layers 41a, 41b is wound in an opposite direction and symmetrical to the other.

At least one of these two layers 41a, 41b, particularly, internal layer 41a, has a plurality of interlockable T shapes. These shapes may be locked by an equal number of matching shapes that have either a T section or shape as shown in FIG. 5 or a U section or shape as shown in FIG. 7, whether or not the arms of the U point toward the tube axis.

Layer 41b may have the same structure or be a flat wire, round wire, or wire of another form with or without an interlock, with the wire being wound at an angle of about 55°. An outer sheath 43g fashioned of polyamide 11 may be provided.

The flexible tube of FIG. 8 allows the internal pressure of the fluid to be withstood and the bottom effect to be resisted without the addition of pressure-reinforcing armor as defined above in the present specification.

According to one variant of the embodiment of FIG. 8, the flexible tube may have an interlocked internal carcass having at least one preferably interlockable elongated element which may or may not have a T-shaped shape.

The fact that the internal layer 41a is interlocked is of particular value for the mechanical strength of tube 40, because of the limited axial play and the rounded forms 43 and 44 of the edges of the shapes in contact with tube 40. The rounded forms appear in the cross sections of the shapes—as shown most clearly in FIGS. 5 and 7 in particular.

When the flexible tube according to the invention has a pressure-resistant reinforcing armor and a traction-resistant armor, the traction resistor armor may have a plurality of elongated elements wound at an angle of less than 55°, for example, 25° or 30° relative to the flexible tube axis, at least when the pressure-resistant armor has a large angle relative to the axis of the flexible tube, particularly greater than 80° or 85°.

It will not be a departure from the present invention-if the pairs of cross layers of a single armor do not have symmetrical angles relative to the axis of the flexible tube.

Figure 9:
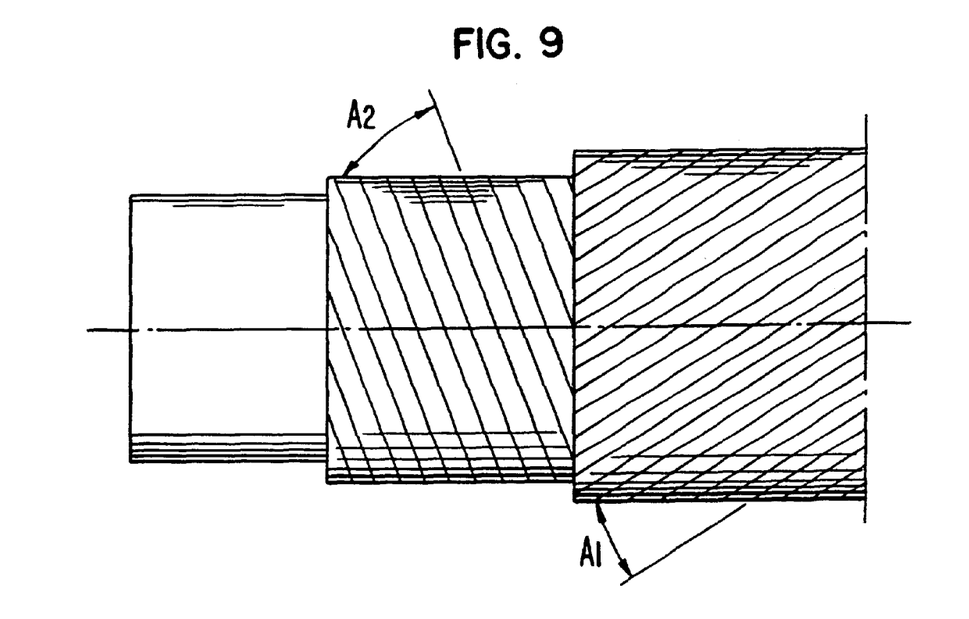
FIG. 9 is a plan view of a flexible tube constructed in accordance with the present invention having two layers that are asymmetrical in their winding directions.

Thus, according to the present invention, the traction-resistant armor may have a pair of layers wound at angles of A1 and A2, one on each side of the flexible tube. The determination of A1 and A2 may emerge in particular from the prior document FR-2.374.580. For example, A1 may be close to 30° and A2 to 70°, as shown in FIG. 9. Other configurations are possible, and angles of A1=54° and A2=56° may be chosen.

It will not be a departure from the present invention for the T shapes to have no interlocking element. When the arms of the T are rectangular in shape, hence with no interlocking means in position on the flexible tube, the feet of the T-shaped element point in the same direction, and a matching rectangular wire can be used to fill up the space between the axially successive feet of the T-shaped elements.

What is claimed is:

1. A reinforced flexible tube comprising:
   a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;
   a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side; and wherein
   the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and
   the difference between the first and second elongated reinforcing elements is in a material from which the first and second elongated reinforcing elements are manufactured.

2. A reinforced flexible tube in accordance with claim 1, wherein:
   the difference between the first and second helically wound elements is also with respect to dimensions of the elements.

3. A reinforced flexible tube in accordance with claim 1 further comprising:
   a fluid conducting conduit disposed inside the first and second elongated reinforcing elements; and
   an outer sheath disposed outside the first and second elongated reinforcing elements.

4. A reinforced flexible tube in accordance with claim 3 wherein:
   the reinforced flexible tube withstands external pressure and internal pressure of fluid in the fluid conducting conduit.

5. A reinforced flexible tube in accordance with claim 1 wherein:
   the lobes of the first and second elongated reinforcing elements extend in only a convex profile from the base which is solid in cross section.

6. A reinforced flexible tube in accordance with claim 5 wherein:
   a fluid conducting conduit disposed inside the first and second elongated reinforcing elements; and an outer sheath disposed outside the first and second elongated reinforcing elements.

7. A reinforced flexible tube in accordance with claim 6 wherein:

the reinforced flexible tube withstands external pressure and internal pressure of fluid in the fluid conducting conduit.

8. A reinforced flexible tube in accordance with claim 1 further comprising:

at least one inner pipe disposed inside of the first and second elongated reinforcing elements with one of the at least one inner pipe having an outside surface Contacting an innermost surface of the first and second elongated reinforcing elements.

9. A reinforced flexible tube in accordance with claim 8 wherein:

a fluid conducting conduit disposed inside the first and second elongated reinforcing elements; and an outer sheath disposed outside the first and second elongated reinforcing elements.

10. A reinforced flexible tube in accordance with claim 9 wherein:

the reinforced flexible tube withstands external pressure and internal pressure of fluid in the fluid conducting conduit.

11. A reinforced flexible tube in accordance with claim 1 wherein:

a pair of the contacting layers are respectively helically wound in opposite directions.

12. A reinforced flexible tube in accordance with claim 11 further comprising:

at least one inner pipe disposed inside of the first and second elongated reinforcing elements with one of the at least one inner pipes having an outside surface contacting an inner surface of the first and second elongated reinforcing elements.

13. A reinforced flexible tube in accordance with claim 12 further comprising:

a fluid conducting conduit disposed inside the first and second elongated reinforcing elements; and an outer sheath disposed outside the first and second elongated reinforcing elements.

14. A reinforced flexible tube in accordance with claim 12 wherein:

the reinforced flexible tube withstands external pressure and internal pressure of fluid in the fluid conducting conduit.

15. A reinforced flexible tube in accordance with claim 11 wherein:

respective angles of winding of each of the pair of contacting layers measured with reference to a longitudinal axis of the tube are equal.

16. A reinforced flexible tube in accordance with claim 15 further comprising:

a fluid conducting conduit disposed inside the first and second elongated reinforcing elements; and an outer sheath disposed outside the first and second elongated reinforcing elements.

17. A reinforced flexible tube in accordance with claim 16 wherein:

the reinforced flexible tube withstands external pressure and internal pressure of fluid in the fluid conducting conduit.

18. A reinforced flexible tube in accordance with claim 15 further comprising:

at least one inner pipe disposed inside of the first and second elongated reinforcing elements with one of the at least one inner pipes having an outside surface contacting an inner surface of the first and second elongated reinforcing elements.

19. A reinforced flexible tube in accordance with claim 18 further comprising:

a fluid conducting conduit disposed inside the first and second elongated reinforcing elements; and an outer sheath disposed outside the first and second elongated reinforcing elements.

20. A reinforced flexible tube in accordance with claim 19 wherein:

the reinforced flexible tube withstands external pressure and internal pressure of fluid in the fluid conducting conduit.

21. A reinforced flexible tube in accordance with claim 1 wherein:

a fluid conducting conduit disposed inside the first and second elongated reinforcing elements; and an outer sheath disposed outside the first and second elongated reinforcing elements.

22. A reinforced flexible tube in accordance with claim 21 wherein:

the reinforced flexible tube withstands external pressure and internal pressure of fluid in the fluid conducting conduit.

23. A reinforced flexible tube in accordance with claim 1 wherein:

at least one of the materials is metal.

24. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the difference between the first and second helically wound elements is also with respect to dimensions of the elements; and a width of the foot is larger than a height of the T-shaped cross-sectional profiles.

25. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the T-shaped cross-sectional profiles have an arm; and a ratio between a length of the arm of the T-shaped cross-sectional profiles of the first and second elongated reinforcing elements to a height thereof is in a range of between 0.5 and 1.

26. A reinforced flexible tube in accordance with claim 25, further comprising:

a fluid conducting conduit disposed inside the first and second elongated reinforcing elements; and an outer sheath disposed outside the first and second elongated reinforcing elements.

27. A reinforced flexible tube in accordance with claim 26 wherein:

the reinforced flexible tube withstands external pressure and internal pressure of fluid in the fluid conducting conduit.

28. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other; and a ratio between a width of the foot of the T-shaped cross-sectional profiles of the first and second elongated reinforcing elements and a length of an arm of the T-shaped cross-sectional profiles of the first and second elongated reinforcing elements is in a range of between 1 and 3.

29. A reinforced flexible tube in accordance with claim 28 further comprising:

a fluid conducting conduit disposed inside the first and second elongated reinforcing elements; and an outer sheath disposed outside the first and second elongated reinforcing elements.

30. A reinforced flexible tube in accordance with claim 29 wherein:

the reinforced flexible tube withstands external pressure and internal pressure of fluid in the fluid conducting conduit.

31. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the difference between;

the T-shaped cross-sectional profiles of the first and second elongated reinforcing elements have a width of the foot and a height; and a ratio between the width of the foot of the T-shaped cross-sectional profiles of the first and second elongated reinforcing elements and the height of the T-shaped cross-sectional profiles of the first and second elongated reinforcing elements is in a range of 0.66 and 3.

32. A reinforced flexible tube in accordance with claim 31 further comprising:

a fluid conducting conduit disposed inside the first and second elongated reinforcing elements; and an outer sheath disposed outside the first and second elongated reinforcing elements.

33. A reinforced flexible tube in accordance with claim 32 wherein:

the reinforced flexible tube withstands external pressure and internal pressure of fluid in the fluid conducting conduit.

34. A reinforced flexible tube comp rising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the T-shaped profile of the first and second elongated reinforcing elements have a width of the foot and a height; and a ratio of the width of the foot of the T-shaped cross-sectional profiles of the first and second elongated reinforcing elements to a height of the T-shaped cross-sectional profiles of the first and second elongated reinforcing elements is in a range of 1.66 to 5.

35. A reinforced flexible tube in accordance with claim 34 further comprising:

a fluid conducting conduit disposed inside the first and second elongated reinforcing elements; and an outer sheath disposed outside the first and second elongated reinforcing elements.

36. A reinforced flexible tube in accordance with claim 35 wherein:

the reinforced flexible tube withstands external pressure and internal pressure of fluid in the fluid conducting conduit.

37. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the T-shaped cross-sectional profiles of the first and second elongated reinforcing elements have a height and an arm with a height; and a ratio between the height of the arm of the T shaped cross-sectional profiles of the first and second elongated reinforcing elements and the height of the T-shaped cross-sectional profiles of the first and second elongated reinforcing elements is in a range of 0.66 and 0.83.

38. A reinforced flexible tube in accordance with claim 37 wherein:

a fluid conducting conduit disposed inside the first and second elongated reinforcing elements; and an outer sheath disposed outside the first and second elongated reinforcing elements.

39. A reinforced flexible tube in accordance with claim 38 wherein:

the reinforced flexible tube withstands external pressure and internal pressure of fluid in the fluid conducting conduit.

40. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the T-shaped cross-sectional profile of the first and second elongated reinforcing elements have a height and the interlocking lobes have a height; and a ratio between the height of the interlocking lobes of the T-shaped cross-sectional profiles of the first and second elongated reinforcing elements and the height of the T-shaped cross-sectional profiles of the first and second elongated reinforcing elements is in a range of 0.16 and 0.66.

41. A reinforced flexible tube in accordance with claim 40 wherein:

a fluid conducting conduit disposed inside the first and second elongated reinforcing elements; and an outer sheath disposed outside the first and second elongated reinforcing elements.

42. A reinforced flexible tube in accordance with claim 41 wherein:

the reinforced flexible tube withstands external pressure and internal pressure of fluid in the fluid conducting conduit.

43. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other and the difference between the first and second elongated reinforcing elements is in a material from which the first and second elongated reinforcing elements are manufactured; and the T-shaped cross-sectional profiles of the first and second elongated reinforcing elements have a width; and a ratio of axial play between the first and second elongated reinforcing elements and the width of the T-shaped cross-sectional profiles of the first and second elongated reinforcing elements is in a range of 2% to 10%.

44. A reinforced flexible tube in accordance with claim 43 wherein:

a fluid conducting conduit disposed inside the first and second elongated reinforcing elements; and an outer sheath disposed outside the first and second elongated reinforcing elements.

45. A reinforced flexible tube in accordance with claim 44 wherein:

the reinforced flexible tube withstands external pressure and internal pressure of fluid in the fluid conducting conduit.

46. A reinforced flexible tube comprising:

a helically wound first elongated reinforcing element having a T-shaped cross-sectional profile having a base and a foot projecting from a first side of the base, the base having a pair of spaced apart lobes extending from the first side of the base and further having a second side opposed to and flat and parallel to at least a part of the first side;

a helically wound second elongated reinforcing element having a T-shaped cross-sectional profile having a base and a foot projecting from a first side of the base, the base having a pair of spaced apart lobes extending from the first side of the base and further having a second side opposed to and flat and parallel to at least part of the first side; and wherein the spaced apart pairs of lobes of the first and second helically wound elongated reinforcing elements are interlocked such that each lobe of the base of the first helically wound reinforcing element is positioned to engage one of the pairs of lobes of the second helically wound reinforcing element and the lobes have a convex profile with portions of the convex profile of the lobes of the first and second helically wound reinforcing elements engaging each other and the first and second helically wound reinforcing elements are different from each other; and the T-shaped profile of the first and second elongated reinforcing elements have a width and a height; and a ratio of the width of the T-shaped profile of the first and second elongated reinforcing elements to the height of the T-shaped profile of the first and second reinforcing elements is in the range of 1.66 to 5.

47. A reinforced flexible tube in accordance with claim 46 wherein:

a fluid conducting conduit disposed inside the first and second elongated reinforcing elements; and an outer sheath disposed outside the first and second elongated reinforcing elements.

48. A reinforced flexible tube in accordance with claim 47 wherein:

the reinforced flexible tube withstands external pressure and internal pressure of fluid in the fluid conducting conduit.

* * * * *